United States Patent Office 3,470,252
Patented Sept. 30, 1969

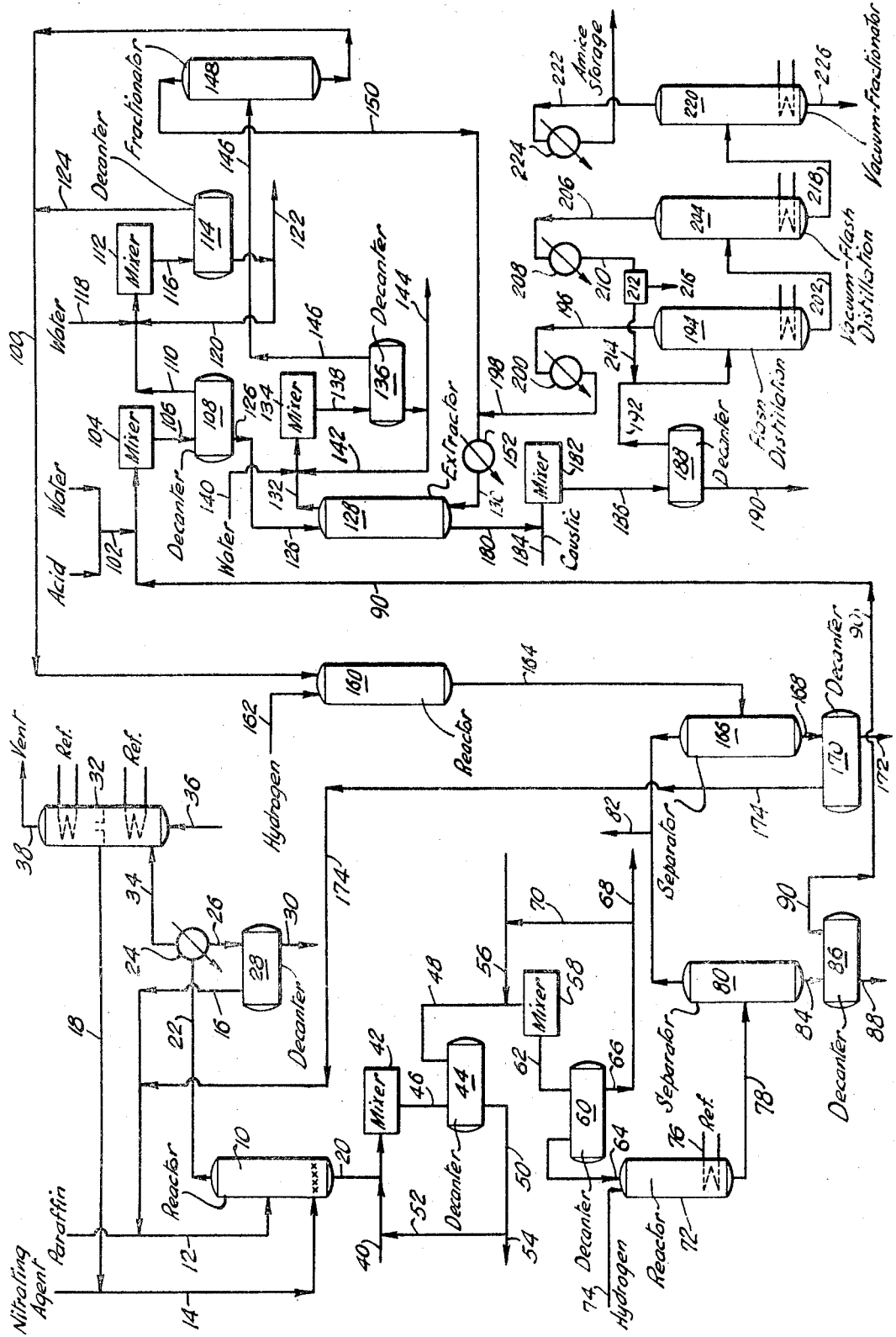

3,470,252
PRODUCTION OF SECONDARY ALKYL PRIMARY AMINES FROM NORMAL PARAFFINS
William P. Doyle, Lagrangeville, and John A. Patterson and Peter C. Peropoulos, Fishkill, N.Y., assignors to Texaco Inc., New York, N.Y., a corporation of Delaware
Filed Aug. 23, 1967, Ser. No. 662,768
Int. Cl. C07c 85/00
U.S. Cl. 260—583     14 Claims

ABSTRACT OF THE DISCLOSURE

A process for producing secondary alkyl primary amines and, in particular, secondary alkyl primary amines having from 10 to 25 carbon atoms wherein a $C_{10}$ to $C_{25}$ paraffin hydrocarbon is reacted in the liquid phase with a vaporous nitrating agent to produce a crude nitrated product containing nitroparaffin and n-paraffin, hydrogenating the nitroparaffin in a paraffin medium and in the presence of a hydrogenation catalyst thereby producing a crude secondary alkyl primary amine product, treating the crude amine product with measured amounts of water and an inorganic acid thereby forming an aqueous amine salt layer, washing the aqueous amine salt layer with a liquid hydrocarbon, treating the aqueous amine salt layer with a base and recovering the amine from the aqueous layer.

---

This invention relates to the production of amines and, more particularly, to the production of secoandary alkyl primary amines having from 10 to 25 carbon atoms from paraffin hydrocarbons.

Secondary alkyl primary amines can be prepared from $C_{10}$ to $C_{25}$ paraffin hydrocarbons by initially nitrating the paraffin with nitric acid or nitrogen dioxide and thereafter reducing the nitroparaffin with hydrogen in the presence of a hydrogenation catalyst. Known hydrogenation catalysts include nickel, copper, platinum and palladium among others and their use has been suggested in reducing organonitro compounds to corresponding amino compounds. However, to effect substantial conversion with correspondingly high product selectivity with such catalysts, the art has employed the assistance of polar solvent mediums such as ethers, alcohols, or esters. Such mediums, however, present disadvantages in that their use requires additional separation and recovery procedures along with costly processing conditions and equipment. Moreover, polar mediums, such as alcohols, are destructive to catalyst life in that the catalysts are progressively solubilized and lost, particularly in continuous operations. Conversely, in the instance where it is desired to convert nitroparaffins in paraffin hydrocarbon solvents to corresponding amines, and particularly crude nitrated paraffin compositions, that is, compositions containing from 5 to 45% nitroparaffins, and 95 to 50% $C_{10}$ to $C_{25}$ paraffins, most conventional hydrogenation catalysts of the copper, platinum and palladium types have demonstrated reduced catalytic activity in hydrocarbon mediums. Moreover, while conventional separation and recovery procedures have provided products of purity approaching 96% there remains a need for a process wherein such amines can be provided in purities of 98% and higher.

It is, therefore, an object of this invention to provide a process for mono-aminating paraffin hydrocarbons having from 10 to 25 carbon atoms.

Another object of this invention is to provide a process wherein mono-nitroparaffins are reduced to corresponding amines in paraffin hydrocarbons.

Yet another object of this invention is to provide a process wherein secondary alkyl primary amines may be separated from crude hydrogenated nitroparaffin mixtures in high purity.

Another object of this invention is to provide a process wherein oxygenates and polyfunctional by-products of the instant process are recovered, converted to n-paraffins and recycled for amination.

Other objects and advantages will become apparent from a reading of the following detailed description and examples.

Broadly, this invention contemplates a process for producing secondary alkyl primary amines from an n-paraffin having from 10 to 25 carbon atoms which comprises nitrating at a temperature of from about 250 to about 500° F. said n-paraffin with a nitrating agent vaporous at said temperature thereby producing a crude nitrated product comprising from 5 to 45% nitroparaffin and from 95 to 50% n-paraffin, hydrogenating said nitroparaffin in a $C_4$ to $C_{25}$ paraffin medium in the presence of a hydrogenation catalyst thereby producing a crude secondary alkyl primary amine product, treating said crude amine product with an inorganic acid, and from about 0.15 to about 6 volumes of water for each volume of the crude amine product thereby forming an aqueous and an organic layer, said aqueous layer having a pH ranging from about 3.5 to about 7, separating said aqueous and organic layers, contacting said aqueous layer with a liquid hydrocarbon having from 4 to 8 carbon atoms and recovering said aqueous layer, adding a base to said aqueous layer thereby forming an amine layer and an aqueous layer, separating said amine layer and distilling and recovering said amine.

PARAFFIN HYDROCARBONS

The paraffin hydrocarbons contemplated in this invention are straight chain aliphatic hydrocarbons containing from 10 to 25 carbon atoms. Such hydrocarbons include n-decane, n-dodecane, n-tetradecane, n-pentadecane, n-octadecane, n-eicosane, n-pentacosae and mixtures thereof.

Typical paraffin hydrocarbon mixtures applicable to this invention include hydrocarbons containing from 10 to 25 carbon atoms, which may be obtained, for example, by absorption in molecular sieves or such other processes, as urea or solvent dewaxing, which are capable of recovering n-paraffin from the mixtures of isoparaffins, naphthenes, aromatics and n-paraffins.

NITRATION

The nitration of paraffin hydrocarbons to secondary mono-nitroparaffins is conducted in a liquid-vapor process. By secondary mono-nitroparaffin we mean that the nitro group is predominantly located on other than the paraffin's terminal carbon atom. The reaction of the liquid paraffin hydrocarbon with a vaporous nitrating agent is conducted at temperatures ranging from about 250 to 500° F., and preferably between 300 to 400° F. at atmospheric pressure but higher pressures up to 20 atmospheres may be employed. Reaction temperatures in excess of 500° F. should be avoided in that paraffin conversion to mono-nitroparaffin may be reduced and the rate of undesirable side reactions, including the formation of polynitro compounds becomes excessive. Such side reaction cause undue contamination of the crude reaction product and require additional costly purification procedures to be employed. At temperatures below 250° F., reaction times become excessively long and unattractive.

Among the nitrating agents contemplated in this process we mention nitrogen dioxide, nitric acid and dinitrogen tetroxide. In either batch or continuous operations the vaporous nitrating agent is best introduced into the reaction zone by bubbling and dissolving the agent in the paraffin hydrocarbon, preferably aided by agitation, so as to create a large interfacial area between the vapor and liquid.

The rate of nitrating agent introduction can vary within wide limits and may be employed as a means to control the rate of nitration. Within the temperature limitations specified above, the rate of nitrating agent addition may vary from 0.05 to 0.55 mole per mole of paraffin per hour. In a highly preferred and efficient operation, the rate of nitrating agent addition corresponds closely to the rate at which the vaporous nitrating agent dissolves and reacts in the paraffin since under these conditions little or no nitrating agent remains unconverted. This preferred rate has been found to be about 0.1 to 0.2 mole of nitrating agent per mole of paraffin per hour. Any excess nitrating agent may be recovered along with, for example, nitric oxide, a reaction by-product, the latter in continuous operations subsequently oxidized to nitrogen dioxide or dinitrogen tetroxide, and the nitrating agent streams recycled for reintroduction into the nitration reaction zone.

According to this process nitration is permitted to proceed until about 5 to about 50% and preferably between about 20 to 40% of the paraffin hydrocarbon has been converted principally to the corresponding mono-nitroparaffin. Conversions in excess of 50% are to be avoided inasmuch as prolonged nitration promotes the formation of undesirable by-products such as polynitro compounds, nitroketones and nitroalcohols while concomitantly decreasing mono-nitroparaffin formation. Conversions below 5% are undesirable because of inefficient and expensive operations.

The illustrative nitration reaction outlined above whether performed batchwise or continuous is preferably permitted to proceed until about 20 to 40% of the paraffin has been converted yielding a crude nitrated product of about 15 to 35% mono-nitroparaffin and from about 80 to 60% unreacted paraffin along with lesser amounts of $C_{10}$ to $C_{25}$ ketones, alcohols, carboxylic acids, nitrates and polyfunctionals. The mono-nitroparaffins so prepared may, if desired, be separated and recovered from the crude product by distillation or extraction and subsequently hydrogenated to the corresponding amine after dilution with a $C_4$ to $C_{25}$ paraffin hydrocarbon. Preferentially, it has been found advantageous to hydrogenate the crude nitrated product directly wherein the unreacted paraffin constitutes the reaction medium.

In a highly preferred embodiment, the crude nitrated product is aqueous caustic washed prior to hydrogenation. It is believed that the presence of substantial amounts of carboxylic acids during the subsequent hydrogenation reaction may be responsible for curtailment of catalyst life and activity in addition to undue corrosion of processing equipment. Whether or not such acids are in fact solely or jointly with other materials responsible for premature catalyst deactivation has been found that catalyst life and activity can be extended by caustic treatment employing for example aqueous solutions of alkali or alkaline earth metal oxides, hydroxides, carbonates or bicarbonates such as sodium hydroxide, potassium hydroxide, lime, sodium carbonate, sodium bicarbonate and ammonium hydroxide. By way of illustration, caustic washing 3 parts of crude with 1 part of 10% aqueous sodium hydroxide has been found to be beneficial in prolonging catalyst life where the catalyst or stream time has been increased two and one-half fold. Subsequent catalyst regeneration was easily accomplished with substantially complete catalytic recovery.

HYDROGENATION

According to this process the nitroparaffins are hydrogenated in the presence of a selected hydrogenation catalyst at temperatures ranging from about 100 to 450° F. and preferably between 200 and 400° F. Hydrogen pressures ranging from 10 to 200 atmospheres have been found to be applicable. The hydrogenation reaction is exothermic in nature and temperatures exceeding 450° F. should be avoided. At temperatures above 450° F. secondary alkyl primary amines interact, liberating ammonia along with substantial formations of undesirable secondary amine.

To maintain the reaction temperature at and below 400° F., it has been found advantageous to conduct the hydrogenation reaction in the presence of a $C_4$ to $C_{25}$ paraffin hydrocarbon. In a highly preferred embodiment the unreacted $C_{10}$ to $C_{25}$ paraffin hydrocarbon contained in the crude nitrated material constitutes the reaction medium. In another embodiment, lower paraffins in the range of $C_4$ to $C_9$ and particularly butane, pentane, hexane and heptane or mixtures thereof which are solvents for nitroparaffins and amines may constitute all or part of the reaction medium. In the latter instance the lower paraffins may be employed in conjunction with unreacted $C_{10}$ to $C_{25}$ paraffin in varying proportions and may be readily separated from the crude hydrogenated product.

High conversion and selectivity are obtained in paraffin hydrocarbon mediums by utilizing a select group of hydrogenation catalysts, namely nickel catalysts. The catalyst contemplated herein may be either in its homogeneous form or supported or impregnated on or in a base such as kieselguhr, silica, alumina, pumice, asbestos, carbon, silica gel and we prefer to employ kieselguhr. A highly preferred catalyst is zirconium modified nickel. Methods for preparing the preferred zirconium modified nickel catalysts are described in U.S. Patent 3,235,515, which is hereby incorporated by reference. The amount of zirconium calculated as metal is in the range of 2 to 10 percent based on the weight of nickel and where support catalysts are contemplated the zirconium modified nickel may constitute from about 0.1 to 50% or more of the composition.

Catalyst to nitroparaffin ratios may vary within wide limits and the optimum proportions are readily determined by experiment. In general, the higher the ratio of catalyst to nitro compound the more rapid the reaction.

The hydrogenation described above is applicable to batch or continuous operations. Suitable reactors may be charged and pressurized, agitation means provided when desired and the reaction allowed to proceed and controlled by hydrogen pressure. Additionally, further control over the operable temperature range is accomplished by providing the hydrogenator with heat transfer means such as, for example, internal cooling coils. Alternatively, continuous operations may be employed where the paraffin-nitroparaffin mixture is permitted to pass through and over the catalyst in the presence of hydrogen and under the conditions of temperature and pressure mentioned above at space velocities ranging from about 0.1 to 10, preferably 0.3 to 1.0 volume of liquid per volume of catalyst per hour.

Hydrogenation of nitroparaffin compositions conducted according to the instant process resulted in high nitroparaffin conversions and over 90% selectivity to the corresponding amine.

AMINE ISOLATION AND RECOVERY

Following hydrogenation, the secondary alkyl primary amine is isolated and recovered from the crude amine product. Such separations and recovery can be effectively carried out wherein the selected amine or mixed amine is recovered in purities of at least 98% by initially treating the crude amine product with specific amounts of an inorganic acid, such as hydrochloric, nitric, sulfuric or phosphoric, in conjunction with measured amounts of water thereby forming and separating the resulting aqueous amine salt and organic layers.

In carrying out the initial separation the amount of acid and water admixed with the crude amine product must be carefully controlled. The water, acid and crude amine product when combined within limited proportions and narrow ranges of pH, form two layers, an organic layer composed of primarily paraffins, alcohols, ketones, unreduced nitroparaffin and polyfunctionals such as nitroketones, nitroalcohols and dinitroparaffins, and an aqueous layer predominantly containing an amine salt along with alcohols, ketones, paraffins, secondary amines and polyfunctionals such as aminoalcohols, aminoketones and diamines. The operative limits of this step have been found to fall within a water-to-crude product volume ratio of between 0.15 and 6 volumes of water for each volume of crude and preferably 0.20 to 3. Amounts less than 0.15 volume of water have been found to be undesirable in that such amounts are insufficient to substantially solubilize the amine salt and, additionally, excessive quantities of n-paraffin and by-products such as ketones are carried into the aqueous layer. Amounts in excess of 6 volumes of water are disadvantageous since, in many instances, a third layer is formed containing substantial amounts of both amine salt and paraffin. Likewise, such excess gives rise to long settling periods and the large volumes materially increase investment costs. Similarly, careful control must be exercised over acid addition so as to provide the aqueous layer with a pH ranging from about 3.5 to 7 and preferably a narrower range of about between 4 and 6. The addition of excess acid, that is, pH's below 3.5, should be avoided since under these conditions the amine salts are displaced from the aqueous layer and into the organic layer. Likewise, insufficient acid, that is, pH's above 7, are undesirable inasmuch as substantial amounts of amine remain unconverted to the amine salt and such unconverted amine is subsequently solubilized in the organic layer. According to this procedure, from about 1 to 1.6 mole of acid, as for example, hydrochloric, nitric, sulfuric or phosphoric, are employed per mole of amine, and preferably 1 to 1.3 mole of acid. Based upon the inorganic acid employed, selected water to crude volume ratios are applicable within the range stated above. For example, when employing a monobasic acid, such as hydrochloric or nitric acid, water in amounts ranging from about 1.0 to 6 volumes per volume of crude and preferably between 1.3 and 3 volumes are utilized. Where a polybasic acid is contemplated, such as sulfuric or phosphoric acid, water in amounts ranging from about 0.15 to 1.0 volume per volume of crude and preferably between 0.2 and 0.5 volume apply.

The aqueous layer thus formed contains, in addition to the amine salt, approximately 25% paraffin on a water-free basis along with ketones and alcohols. Although this amount of paraffin is acceptable in the aqueous layer mentioned above, the percent may be reduced by admixing the hydrogenated crude nitrated product with acid and water and separating the aqueous and organic layers at temperatures ranging from room temperature to about 250° F. and preferably between 50 and 200° F. under atmospheric or higher pressures. By increasing the acid-water treatment temperature, the solubility of non-amine salt components in the aqueous layer is decreased. In like manner, where higher molecular weight amines are to be recovered, that is, amines having carbon chain length of from 14 to 25 carbon atoms, the tendency to form aqueous emulsions is reduced where temperatures of 100° F. or higher are employed. Finally, higher temperatures favor amine salt solubility in the aqueous layer.

Subsequent to the water-acid treatment, the aqueous amine salt phase, after separation from the organic layer, is preferably contacted with a suitable liquid hydrocarbon under conditions to selectively remove the remaining paraffin, ketone, alcohol and some polyfunctionals. More specifically, the processing steps embodied herein comprise contacting the aqueous amine salt phase with a liquid hydrocarbon having from 4 to 8 carbon atoms at a temperature ranging from about 50 to 212° F. at pressure of 1 atmosphere or higher to extract all or substantially all of the non-amine salt components in the aqueous phase. Applicable liquid hydrocarbons include aliphatics such as butane, pentane, hexane, heptane, octane and isooctane; olefins such as butene and octene; cycloaliphatics such as cyclohexane; and aromatics such as benzene, toluene and xylene. A preferred liquid hydrocarbon, pentane, has been found to be particularly effective in selectively and substantially extracting the remainder of the paraffin, ketone, alcohol and any polyfunctionals not containing an amine function from the aqueous phase.

Alternatively, in lieu of contacting the aqueous amine salt phase with a liquid hydrocarbon, steam distillation may be substituted to remove non-amine salt components. Such non-amine salt components are effectively removed at temperatures ranging from about 212 to about 350° F. under pressures ranging from atmospheric to about 120 p.s.i.g.

Either continuous, batch or batch-continuous concurrent or countercurrent operation is permissible when employing hydrocarbon extraction techniques. The exact manner is not critical provided that the aqueous amine salt is brought into intimate contact with the liquid hydrocarbon. The amount of hydrocarbon employed may also vary, it being a function of the number of stages and the required ultimate amine purity. Countercurrent or concurrent extraction techniques will similarly dictate the amount to be utilized. For example, in batch concurrent operations approximately 0.5 volume of liquid hydrocarbon and preferably abut 1 to 2 volumes, are required for one volume of aqueous amine salt solution. In a batch-continuous system however, where the liquid hydrocarbon is continuously stripped from the extract to recycle, much less solvent is needed.

The resulting aqueous layer after removal of the remaining paraffin and ketone, alcohol and any polyfunctionals not containing an amine function is thereafter treated with at least a stoichiometric amount of a base and generally from about one to two moles of base where a monobasic acid such as hydrochloric or nitric is employed, and about two to three moles of base where a polybasic acid such as sulfuric or phosphoric is used. Suitable bases include inorganic bases such as sodium or potassium hydroxide, ammonia or ammonium hydroxide, lime, alkaline earth metal oxides or hydroxides, carbonates or acid carbonates such as sodium carbonate or sodium bicarbonate, thereby springing the amine from the aqueous layer. The amine is recovered by phase separation leaving an aqueous layer containing the alkali, alkaline earth or ammonium salt and may be disposed of as desired.

The amine layer thus separated contains approximately from 50 to 90% amine, the remainder being water or a water-liquid hydrocarbon mixture. An amine product is obtained after removal of the water and any liquid hydrocarbon by flash distillation. Higher purities in the range of 99.5% may be obtained by vacuum distillation of the amine product.

The high purity amines provided by the instant process are highly desirable in such applications as anticaking agents, biocides, textile treating agents, fabric softeners, paint additives, fuel additives, lubricant additives, surfactants and catalysts.

With reference to the drawing, an n-paraffin feed stock, for example, a mixture of $C_{10}$–$C_{14}$ n-paraffins is charged into nitration reactor 10 through line 12 and contacted therein with a vaporized nitrating agent, such as nitrogen dioxide, entering the lower portion of the reactor through line 14. Intimate mixing of the liquid paraffin and vaporous nitrating agent can be supplemented, if necessary, by agitation means. In practice, flows through line 12 and 14 may be heated or the reactor 10 may contain heating elements such that paraffin nitration occurs at a temperature ranging from about 250 to 500° F. and preferably between 300 and 400° F. Provisions are made in lines 12 and 14 for the introduction of n-paraffin and nitrating agent recycles through lines 16 and 18, respectively.

Crude nitrated paraffin is withdrawn through line 20 and the off gases pass out of reactor 10 through line 22. The offgases, comprising mixtures of n-paraffin, nitrating agent, nitric oxide, nitrogen, carbon dioxide and water, pass through cooler separator 24, the paraffin condensing along with some water and dissolved $CO_2$ and withdrawn through line 26, into decanter 28, water and any dissolved $CO_2$ separated through line 30 and the n-paraffin recycled to reactor 10 through line 16.

The overhead from cooler separator 24 is fed to oxidizer 32 through line 34 where oxidizer 32 is supplied with an oxidizing agent such as air, oxygen or oxygen-containing material such as nitric acid through line 36 to convert nitric oxide to nitrogen dioxide. The oxidation is carried out at a temperature of from about 80° F. to 100° F. The reconstituted nitrating agent is further cooled to about 20° F. and recycled to reactor 10 through line 18. Oxidizer offgas composed of carbon dioxide, nitrogen and oxygen and traces of nitrogen dioxide and nitric oxide leave through line 38, being caustic scrubbed, if desired, and thereafter vented. Optionally after condensing paraffin and water, the overhead in line 34 is passed countercurrent to 50 to 100% and preferably 60% nitric acid in a reactor (not shown) maintained at about 100 p.s.i.g. and 250° F. The gases, comprising nitrogen dioxide, water, nitrogen and carbon dioxide, are passed through a condenser where water and nitric acid are removed from the stream. A portion of the nitrogen dioxide rich stream is bypassed through a cooling zone where nitrogen dioxide is condensed and returned to the circulating nitrogen dioxide stream and the gaseous products including nitrogen and carbon dioxide are vented. The nitrogen dioxide rich stream is thereafter recycled to the nitration reactor through line 18.

The crude nitrated paraffin from reactor 10 withdrawn through line 20 comprises n-paraffin, nitroparaffin, oxygenates and polyfunctionals. Contained in the crude as oxygenates are carboxylic acids which are preferably removed by caustic washing with alkali or alkaline earth metal oxides, hydroxides, carbonates or bicarbonates, or ammonium hydroxide prior to hydrogenation.

Aqueous caustic is introduced into line 20 through line 40 and both introduced into line mixer 42 and into decanter 44 through line 46. Crude nitrated paraffin is removed through line 48 and caustic separated from decanter 44 through line 50 a portion of which is recirculated to line 40 through line 52 and the remainder discarded through line 54. Water is introduced into line 48 through line 56 and both introduced into line mixer 58 and from there to decanter 60 through line 62. The washed crude nitrated paraffin in decanter 60 is removed through line 64 and water separated through line 66 a portion recycled to line 56 through line 70 and the remainder discarded through line 68.

The crude nitrated paraffin in line 64 is introduced into hydrogenation reactor 72 containing the hydrogenation catalyst and hydrogen or hydrogen-containing material is introduced through line 74 and passed downward through reactor 72. Cooling is accomplished by cooling coils 76 in the bed.

The crude hydrogenated product exiting through line 78 comprises hydrogen, n-paraffin, secondary alkyl primary amine and lesser amounts of di-(secondary alkyl) amines, alcohols, ketones, polyfunctionals, nitroparaffin and water and is introduced into separator 80. Hydrogen, methane, ethane, and propane, representing light paraffins which may be present as impurities and introduced through line 74 in the hydrogen charge, are removed through line 82. The liquid product containing n-paraffin, secondary alkyl primary amine and lesser amounts of di-(secondary alkyl) amines, alcohols, ketones, polyfunctionals and nitroparaffin is removed through line 84, introduced into decanter 86 where water is separated through line 88 and the crude amine product is removed from the decanter through line 90 for amine isolation and recovery.

Inorganic acid and water are introduced through line 102 into line 90 carrying the crude amine product and both introduced into line mixer 104 and into decanter 108 through line 106. The hydrocarbon layer in decanter 108 is removed through line 110 through line mixer 112 and into decanter 114 through line 116. Water is introduced into line 110 through line 118 and water is separated from decanter 114 and recycled to line 110 through line 120 of which a portion of recycle water is discarded through line 122. The recovered n-paraffin is removed through line 124 to line 100 for further purification.

The aqueous amine salt solution is removed from decanter 108 through line 126 into the top of extractor 128. Liquid hydrocarbon is introduced at the bottom of vessel 128 through line 130 and after contacting the amine salt solution the liquid hydrocarbon is withdrawn from the top of extractor 128 through line 132 through a line mixer 134 and into decanter 136 through line 138. Water is introduced into line 132 through line 140 and water is separated from decanter 136 through line 142 and recycled to line 132 of which a portion of recycle water is discarded through line 144. The recovered liquid hydrocarbon extract is removed through line 146 and introduced into paraffin fractionator 148. The overhead distillate comprising the liquid hydrocarbon is recycled through line 150 to extractor 128 through condenser 152 and line 130 and the bottoms of fractionator 148 are removed through line 100 for further purification.

The bottoms of fractionator 148 along with the n-paraffin layer recovered through line 124 are introduced through line 100 into a downflow hydrogenator 160 where hydrogen or a hydrogen containing gas is introduced through line 162. The crude in line 100 contains, in addition to n-paraffin, alcohol, ketone, nitroparaffin and such polyfunctionals as nitroketone, nitroalcohol and dinitroparaffin. Hydrogenolysis of the oxygenated and nitrated by-products to n-paraffin constitutes a highly preferred and significant aspect of this process and is conducted at temperatures of from 450 to 600° F. under hydrogen pressures of from 200 to 4000 p.s.i.g. and at a liquid hourly space velocity of from 0.1 to 20 volumes of liquid per volume of catalyst per hour. Within this range we prefer temperatures of from 525 to 575° F., under hydrogen pressures of from 400 to 600 p.s.i.g. and space velocities of from 2 to 5 v./v./hr. Temperatures below 450° F. have not been found to give appreciable hydrogenolysis and temperatures in excess of 600° F. cause undesired isomerization and cracking of the hydrocarbons. In general, hydrogenolysis may be conducted in the presence of known and conventional hydrogenation catalysts illustrations being nickel, cobalt, platinum, palladium and rhodium.

The entire liquid and gaseous product is removed from hydrogenator 160 and passed through line 164 to vapor liquid separator 166. Overhead gases from separator 166 are removed through line 82. The liquid product containing paraffin, water and ammonia is removed from separator 166 through line 168 to decanter 170 where aqueous ammonia is separated through line 172 and purified n-paraffin is returned from decanter 170 to the nitration reactor 10 through lines 174, 16 and 12.

In another embodiment (not shown), the crude in line 100 is treated with sulfuric acid where ketones, alcohols, oxygenates, polyfunctionals and non-paraffins are separated from the paraffin recycle. By this technique, one hundred parts of crude are mixed with from 0.35 to 2.0 parts of 93 to 98 percent sulfuric acid and the mixture is thereafter separated into a spent acid layer and a paraffin layer. A portion of the spent acid is prudently recycled and mixed with make-up acid in a continuous crude treatment. The paraffin layer, after water washing and decantation to remove entrained acid, is recycled to nitration reactor 10 through lines 174, 16 and 12.

The liquid hydrocarbon extracted aqueous amine salt solution is removed from extractor 128 through line 180, contacted with aqueous caustic introduced through line 184 and both introduced into line mixer 182 and from there through line 186 to decanter 188 where the aqueous layer is separated and removed through line 190. The crude amine is recovered from decanter 188 through line 192 and introduced into atmospheric flash distillation column 194 from which dissolved liquid hydrocarbon is vaporized through line 196 and after passing through condenser 200 is returned to the liquid hydrocarbon extraction system through line 198 where it is introduced into line 150. The liquid hydrocarbon denuded amine is removed from the bottom of column 194 through line 202 and is introduced into vacuum flash distillation column 204 from whence residual traces of liquid hydrocarbon and water are removed overhead through line 206 and after condensation through cooler 208 is reintroduced to the crude amine product in line 192 through line 210, decanter 212, and line 214, water from decanter 212 being separated through line 216. Alternatively (not shown), overhead from column 204 may be introduced directly into line 126 through line 206 and cooler 208. The amine bottoms from flash column 204 are removed through line 218 and introduced into vacuum fractionating column 220 for the final purification of the amine product, the amine product passing overhead through lines 222, then through condenser 224 and thence to amine storage and the impurities such as di-(secondary alkyl) amine and polyfunctional being removed at the bottom of column 220 through line 226 and if desired introduced into line 100 for purification as previously described.

Example I

A continuous paraffin amination system embodying a preferred arrangement of apparatus described in the accompanying diagrammatic drawing is provided for the amination of a normal $C_{10}$–$C_{15}$ paraffin hydrocarbon composition having the following carbon chain length distribution on a weight percent basis: $C_{10}$—8.5, $C_{11}$—30.8, $C_{12}$—29.2, $C_{13}$—25.3, $C_{14}$—6.1 and $C_{15}$—0.1.

The paraffin hydrocarbon is continuously charged into a nitration reactor at the rate of 6168.2 pounds per hour along with 867.9 pounds per hour of nitrogen dioxide wherein nitration proceeds at 330° F. under atmospheric pressure. Offgases comprising paraffin, nitrogen dioxide, nitric oxide, nitrogen, carbon dioxide and water are drawn overhead from the reactor, partially condensed and paraffin recycled to the reactor. The remaining overhead gas is oxidized with oxygen at a temperature of 80° F. converting nitric oxide to nitrogen dioxide and/or dinitrogen tetroxide, the oxidized gases cooled to a temperature of 20° F. and the liquefied nitrating agent recycled for reintroduction to the reactor. Non-condensible gases including nitrogen, carbon dioxide and oxygen are vented.

Crude nitrated paraffin comprising 60% n-paraffin, 27.3% nitroparaffin and 12.7% oxidized paraffin and polyfunctionals is continuously caustic washed with equal weights of 10% aqueous sodium hydroxide and water, the aqueous and organic layers separated and thereafter the caustic washed crude nitrated paraffin is passed along to hydrogenation.

The crude nitrated paraffin composition is then fed to a hydrogenation reactor containing a zirconium modified nickel on kieselguhr catalyst at a liquid hourly space velocity of 0.4 volume of liquid per volume of catalyst per hour and permitted to react at 360° F. and under a reformed hydrogen pressure of 400 p.s.i.g. composed of approximately 25.8% hydrogen, 33.6% methane, 19.4% ethane and 21.2% propane. Following hydrogenation, where substantially all of the nitroparaffin is reduced to amine, hydrogen and lower $C_1$–$C_3$ hydrocarbons are removed as gases and water is decanted from the crude. 5810 pounds per hour of crude hydrogenated product comprising 65.8% paraffin, 23.7% amine and 10.5% oxygenates and polyfunctionals is acidified with 880.7 pounds per hour of 20° Bé. hydrocloric acid and 11,494 pounds per hour of water followed by separation of the aqueous and organic layers. The organic layer composed of 85% paraffin and 15% oxygenates and polyfunctionals is water washed and recycled for hydrogenation and purification.

14,124.4 pounds per hour of the separated aqueous layer comprising 11.7% amine hydrochloride, 73.4% water and 14.9% paraffin is countercurrently contacted with 1942.1 pounds per hour of pentane in an extractor wherein substantially all of the paraffin is extracted and carried overhead in the pentane. The pentane overhead is thereafter washed with water, the water decanted and the pentane fractionated and recycled to the extractor. The bottoms composed of paraffins, oxygenates and polyfunctionals are recycled for hydrogenation and purification.

14,360 pounds per hour of the extracted aqueous layer is neutralized with 613.1 pounds per hour of 50% aqueous sodium hydroxide solution and the resulting aqueous phase decanted off and the organic layer composed of 69.3% amine, 0.4% paraffin and 30.3% pentane is first atmospherically flashed to remove overhead a greater portion of pentane, next vacuum flash distilled to remove any remaining pentane along with minor amounts of amine and thereafter vacuum factionated at a bottoms temperature of 350° F. under 20 mm. of Hg pressure where the amine product comprising 99.5% amine and 0.5% paraffin is recovered. Pentane overheads are recycled to the extractor and amines condensed from the pentane fractions are recycled to the atmospheric flash distillation unit.

The paraffin, oxygenates and polyfunctionals recovered as organic layers following acid treatment and pentane extraction are combined and consist of primarily 86% paraffin, 6% oxygenates and 8% polyfunctionals. This crude organic layer is introduced into a downflow hydrogenator containing a 60% nickel-on-kieselguhr catalyst at the rate of 4428 pounds per hour along with 96.8 pounds per hour of reformer hydrogen, the composition of which was earlier stated. Hydrogenolysis of the oxygenated and nitrated by-products to normal paraffins is permitted to proceed at a temperature of 550° F. under a pressure of 400 p.s.i.g. and at a liquid hourly space velocity of 3 volumes of liquid per volume of catalyst per hour. Following hydrogenolysis the liquid and gaseous products are separated, the gaseous products comprising hydrogen, methane, ethane and propane. Water and ammonia from the liquid portion is decanted from the lighter paraffin layer and the paraffin is recycled to nitration.

Example II 170 pounds of n-paraffin having a carbon chain length distribution as in Example I was charged to a 50 gallon reactor. The reactor was equipped with a condenser maintained at 80 to 100° F. which condensed any volatilized hydrocarbon condensate to a separator wherein the hydrocarbon layer was drawn off and returned to the reactor. The reactor was heated to 330° F. with stirring under a nitrogen atmosphere and 25 pounds of nitrogen dioxide was bubbled through a sparger at a rate of 5 pounds per hour. Thereafter, the reactor was cooled to 150° F. and 26.3 pounds of an aqueous solution containing 5% sodium bicarbonate was charged to the reactor, stirred for ¼ hour, the mixture settled for ½ hour and the aqueous layer drained from the bottom of the reactor. The crude nitrated product in the reactor was washed with 20 pounds of water with stirring for ¼ hour, settled for ½ hour and separated. The washed crude nitrated product in the reactor was filtered. 176.1 pounds of crude nitrated product was obtained which analyzed on a weight percent basis as follows: nitroparaffin 27.2, paraffin 63.6, oxygenates 4.2 and polyfunctional 4.7.

130 pounds of the above crude nitrated product was charged to a concurrent downflow hydrogenation reactor maintained at 500 p.s.i.g. and 300° F. The liquid hourly space velocity was 0.675 volume liquid/volume of catalyst/hour and the hydrogen space velocity was 4.82 cu. ft./hour/liter of liquid feed. The catalyst was 50 wt.

percent nickel-on-kieselguhr support activated with 2 wt. percent zirconium.

A total of 123.2 pounds of crude hydrogenated product was obtained which had a total base number of 94.

29.5 pounds of crude hydrogenated product was charged to a 20 gallon glass kettle along with 14,932 ml. of 1.5 N HCl and the mixture stirred for one hour. The pH of the aqueous solution was about 5. An additional 41.8 pounds of water was added and the mixture stirred for an additional hour. The mixture was thereafter allowed to settle 3 hours whereupon the layers were separated to yielding 19.7 pounds of an organic phase and 85.0 pounds of aqueous phase. The aqueous phase contained 78.2 weight percent amine hydrochloride calculated as amine and 21.8 weight percent paraffin on an acid and water free basis.

The aqueous layer was recharged into a kettle along with 55.3 pounds of pentane and the mixture stirred 1 hour and settled for 2 hours. The layers were separated to yield 45.8 pounds of organic phase and 81.8 pounds of an aqueous phase. The aqueous layer contained 93.8 weight percent amine hydrochloride calculated as amine and 6.2 weight percent paraffin on an acide and water pentane free basis. The aqueous phase was recharged to a 20 gallon kettle along with 51.3 pounds of pentane, stirred 1 hour and settled for 2 hours. The layers were then separated to yield 49.8 pounds of an organic phase and 82.1 pounds of an aqueous phase. The aqueous layer was recharged to a 20 gallon kettle along with 5.6 pounds of 30% aqueous sodium hydroxide, stirred ½ hour and settled 4 hours. The layers were separated to yield 10.4 pounds of an organic phase and 75.5 pounds of an aqueous phase. The organic phase consists of approximately 50 weight percent amine and 50 weight percent pentane.

10 pounds of the organic phase was charged to a batch still having a 10 inch column packed with ⅓" raschig rings and pentane was stripped off at atmospheric pressure to a head temperature of 204° F. and a pot temperature of 252° F. The weight of pentane taken overhead was 5.21 pounds. The pot was cooled to 120° F. and evacuated to 20 torr. The temperature was again raised and a forerun of 56 cc. was collected. A total of 3.6 pounds of amine product was collected to a head temperature of 300° F. and a pot temperature of 390° F. 0.69 pound of bottom material was recovered. The distilled primary amines gave the following analysis:

| Component: | Weight percent |
|---|---|
| n-Paraffins | 0.5 |
| Amino decanes | 8.4 |
| Amino undecanes | 32.0 |
| Amino dodecanes | 30.0 |
| Amino tridecanes | 25.0 |
| Amino tetradecanes | 3.9 |

Elemental analysis:

| C | 76.5 |
|---|---|
| H | 15.0 |
| N | 7.8 |
| Basic nitrogen | 7.7 |

Physical properties:

| Molecular weight | 187 |
|---|---|
| Refractive index $n_D^{25}$ | 1.4389 |
| Density, 20° C. | 0.7984 |
| Flash, ° F. | 230 |
| Fire, ° F. | 235 |
| Freezing point, ° F. | −63 |
| Pour point, ° F. | −65 |
| Cloud point, ° F. | −60 |

Color:

| Gardner | 1 |
|---|---|
| ASTM | 0.5 |

The organic layers separated after each pentane wash are charged into a still having a ten inch column packed with ⅓ inch raschig rings and 94 pounds or pentane is stripped off at a head temperature of 204° F. 1.5 pounds of residue remain comprising primarily n-paraffin along with approximately 6 weight percent ketones and alcohols. This residue is combined with the organic phase separated after amine removal and is charged along with hydrogen into a downflow hydrogenator containing 50 ml. of a 60 percent nickel-on-kieselguhr catalyst. Hydrogenolysis of the oxygenated and nitrated by-products to normal paraffin proceeds at 550° F. under a pressure of 500 p.s.i.g. and at a liquid hourly space velocity of 3 volumes of liquid charge per volume of catalyst per hour. About 19 pounds of 99 weight percent pure normal paraffin is produced.

We claim:

1. A process for producing secondary alkyl primary amines from an n-paraffin having from 10 to 25 carbon atoms which comprises:
    (a) contacting said paraffin with a vaporous nitrating agent at temperatures ranging from about 250 to 500° F. and converting from about 5 to about 50% of said paraffin to produce a crude mixture containing said paraffin, secondary mono-nitroparaffin, ketones, alcohols, carboxylic acids, nitrates and polyfunctionals having from 10 to 25 carbon atoms;
    (b) reacting said crude mixture of (a) in the presence of a non-polar paraffin hydrocarbon medium and a nickel catalyst with hydrogen at a temperature of from about 100 to 450° F. to produce a crude mixture containing secondary alkyl primary amine;
    (c) treating said crude product of (b) with from 0.15 to 6.0 volumes of water for each volume of said crude and an organic acid thereby forming an aqueous and an organic layer, said aqueous layer having a pH ranging from about 3.5 to 7;
    (d) separating said aqueous and organic layer, said aqueous layer comprising amine salt, n-paraffin, ketone and alcohol having from 10 to 25 carbon atoms, said organic layer comprising n-paraffin, ketone, alcohol, and unreduced nitroparaffin having from 10 to 25 carbon atoms;
    (e) separating said n-paraffin, ketone and alcohol from said aqueous layer of (d);
    (f) combining said n-paraffin, ketone, alcohol and unreduced nitroparaffin, ketone and alcohol of (e), (d) with said n-paraffin, ketone and alcohol of (e), hydrogenating the resulting mixture and recycling this hydrogenated product to (a);
    (g) treating said aqueous layer of (e) with a base and separating the resulting aqueous and amine layers; and
    (h) recovering said secondary alkyl primary amine.

2. A process according to claim 1 wherein said mononitroparaffin is washed with aqueous caustic prior to hydrogenation in step (b).

3. A process according to claim 1 wherein said mononitroparaffin is washed with aqueous sodium hydroxide prior to hydrogenation in step (b).

4. A process according to claim 1 wherein said catalyst is zirconium modified nickel.

5. A process according to claim 1 wherein said medium in step (b) is a $C_{10}$ to $C_{25}$ paraffin hydrocarbon.

6. A process according to claim 1 wherein the space velocity in step (b) is from 0.1 to 10 volumes of liquid per volume of catalyst per hour.

7. A process according to claim 1 wherein the space velocity in step (b) is from 0.3 to 1 volume of liquid per volume of catalyst per hour.

8. A process according to claim 1 wherein off-gases from step (a) comprising nitrating agent and nitric oxide are contacted with an oxidizing agent and recycled to step (a).

9. A process according to claim 1 wherein n-paraffin, ketone and alcohol are separated from said aqueous layer in step (e) with a liquid hydrocarbon having from 4 to 8 carbon atoms.

10. A process according to claim 1 wherein n-paraffin, ketone and alcohol are separated from said aqueous layer in step (e) by steam distillation at temperatures from about 212° F. to about 350° F. under pressures ranging from atmospheric to about 120 p.s.i.g.

11. A process according to claim 1 wherein from one to three moles of said base are added in step (f) per mole of said acid added in (c).

12. A process according to claim 1 wherein said base in step (f) is sodium hydroxide.

13. A process according to claim 1 wherein said organic layer of step (d) and said n-paraffin, ketone and alcohol of step (e) are combined, treated with sulfuric acid and n-paraffin recycled to step (a).

14. A process for producing secondary alkyl primary amines from an n-paraffin having from 10 to 25 carbon atoms which comprises:
  (a) contacting said paraffin with a vaporous nitrating agent selected from the group consisting of nitrogen dioxide, nitrogen tetroxide and nitric acid at temperatures ranging from about 300 to 400° F. and converting from about 5 to about 50% of said paraffin to produce a crude mixture containing said paraffin, secondary mono-nitroparaffin, ketones, alcohols, carboxylic acids, nitrates and polyfunctionals having from 10 to 25 carbon atoms;
  (b) treating said crude mixture of (a) with aqueous caustic and separating from said mixture an aqueous layer;
  (c) reacting said crude mixture of (b) in the presence of a non-polar $C_{10}$ to $C_{25}$ paraffin hydrocarbon medium and a zirconium modified nickel catalyst, said zirconium present in an amount of 2 to 10 percent based on the weight of nickel, with hydrogen at a temperature of from 200 to 400° F. and at a space velocity of from 0.1 to 10 volumes of liquid per volume of catalyst per hour to produce a crude mixture containing secondary alkyl primary amine;
  (d) treating said crude product of (c) with from 0.20 to 3.0 volumes of water for each volume of said crude and an inorganic acid selected from the group consisting of hydrochloric acid, nitric acid, sulfuric acid and phosphoric acid at a temperature of at least 100° F. thereby forming an aqueous and an organic layer, said aqueous layer having a pH ranging from about 3.5 to 7;
  (e) separating said aqueous and organic layer, said aqueous layer comprising amine salt, n-paraffin, ketone and alcohol having from 10 to 25 carbon atoms, said organic layer comprising n-paraffin, ketone, alcohol and unreduced nitroparaffin having from 10 to 25 carbon atoms;
  (f) contacting said aqueous layer of (e) with a liquid hydrocarbon selected from the group consisting of butane, pentane, hexane, heptane, octane and iso-octane at a temperature of from about 50 to 212° F. and separating an aqueous layer and a liquid hydrocarbon layer, said hydrocarbon layer containing said n-paraffin, ketone and alcohol having from 10 to 25 carbon atoms;
  (g) recovering said n-paraffin, ketone and alcohol having from 10 to 25 carbon atoms from said liquid hydrocarbon layer of (f), combining said recovered products with said n-paraffin, ketone, alcohol and unreduced nitroparaffin from said organic layer of (e), hydrogenating the resulting mixture in the presence of a hydrogenation catalyst at a temperature of from 450 to 600° F. under pressures ranging from 200 to 4000 p.s.i.g. and recycling said hydrogenated product to (a);
  (h) treating said aqueous layer of (f) with from one to three moles of a base per mole of said acid added in (d) and separating the resulting aqueous and amine layers; and
  (i) recovering said secondary alkyl primary amine.

References Cited

UNITED STATES PATENTS

| | | | |
|---|---|---|---|
| 2,174,498 | 9/1939 | Johnson | 260—583 |
| 3,336,386 | 8/1967 | Dovell et al. | 260—583 X |
| 3,366,686 | 1/1968 | Rosenthal et al. | 260—583 |

CHARLES B. PARKER, Primary Examiner

R. L. RAYMOND, Assistant Examiner

U.S. Cl. X.R.

260—689

PO-1050
(5/69)

UNITED STATES PATENT OFFICE
CERTIFICATE OF CORRECTION

Patent No. 3,470,252      Dated September 30, 1969

Inventor(s) William P. Doyle, John A. Patterson and Peter C. Peropoulos

It is certified that error appears in the above-identified patent and that said Letters Patent are hereby corrected as shown below:

Column 1, line 31, "secoandary" should read --secondary--.
Column 2, line 38, "n-pentacosae" should read --n-pentacosane--.
Column 2, line 62, "reaction" should read --reactions--.
Column 6, line 27, "abut" should read --about--. Column 11, line 23, "acide" should read --acid--. Column 12, line 35, "organic" should read --inorganic--. Column 12, line 47, delete "ketone and alcohol of (e)" and insert --from said organic layer in--.

SIGNED AND
SEALED
NOV 17 1970

Nov 17, 1970

(SEAL)
Attest:

Edward M. Fletcher, Jr.
Attesting Officer

WILLIAM E. SCHUYLER, J
Commissioner of Patents